US009689492B2

(12) United States Patent
LaVoie et al.

(10) Patent No.: US 9,689,492 B2
(45) Date of Patent: Jun. 27, 2017

(54) TORQUE CONVERTER HAVING VARIABLE PITCH STATOR

(71) Applicant: FORD GLOBAL TECHNOLOGIES, LLC, Dearborn, MI (US)

(72) Inventors: Vincent Patrick LaVoie, Canton, MI (US); Norman Jerry Bird, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 14/457,265

(22) Filed: Aug. 12, 2014

(65) Prior Publication Data
US 2016/0047469 A1 Feb. 18, 2016

(51) Int. Cl.
F16D 33/04 (2006.01)
F16H 61/56 (2006.01)
F16H 41/26 (2006.01)
F16H 61/60 (2006.01)
F16H 41/28 (2006.01)

(52) U.S. Cl.
CPC ............ F16H 61/56 (2013.01); F16H 41/26 (2013.01); F16H 61/60 (2013.01); F16H 2041/285 (2013.01)

(58) Field of Classification Search
CPC .... F16H 2041/285; F16H 61/56; F16H 61/60; F16H 61/62
USPC .................................. 60/345, 354, 355, 356
See application file for complete search history.

(56) References Cited

U.S. PATENT DOCUMENTS

| 1,129,720 | A | | 2/1915 | Patterson |
| 2,382,034 | A | | 4/1932 | Wemp |
| 2,339,483 | A | * | 1/1944 | Jandasek ................. F16H 61/60 60/356 |
| 2,389,174 | A | | 11/1945 | Whitworth |
| 2,400,622 | A | | 5/1946 | Althoff |
| 2,501,771 | A | | 3/1950 | Gray |
| 2,871,792 | A | | 2/1959 | Mead |
| 2,909,034 | A | | 10/1959 | Jandasek |
| 2,929,214 | A | | 3/1960 | Stump et al. |
| 2,944,402 | A | | 7/1960 | Russell |
| 2,944,441 | A | | 7/1960 | Russell |
| 2,995,955 | A | * | 8/1961 | Kelley .................... F16H 61/56 60/345 |
| 3,886,729 | A | * | 6/1975 | Amann ................... F16H 61/56 60/354 |
| 3,934,414 | A | * | 1/1976 | Merkle ................... F16H 61/56 60/345 |

(Continued)

FOREIGN PATENT DOCUMENTS

JP 08114262 A 5/1996

Primary Examiner — Michael Leslie
(74) Attorney, Agent, or Firm — James Dottavio; Brooks Kushman P.C.

(57) ABSTRACT

A transmission includes a torque converter stator with controllable blade angle. The blade angle is adjusted by adjusting the rotational position of a control ring with respect to a stator hub. The stator blades are supported by the stator hob, a locking ring, and an outer ring. The stator blades have teeth that mesh with teeth on the control ring to determine blade angle. A controller adjust the blades by commanding fluid pressures in hydraulic circuits routed to the stator hub. Various circumstances in which the controller would adjust the blade angle are discussed.

12 Claims, 6 Drawing Sheets

(56) References Cited

U.S. PATENT DOCUMENTS 4,047,383 A    9/1977  Johnson et al.
7,500,548 B2*  3/2009  Kimes .................... F16D 41/12
                                                192/46

* cited by examiner

TORQUE CONVERTER HAVING VARIABLE PITCH STATOR

TECHNICAL FIELD

This disclosure relates to the field of automotive transmissions. More particularly, the disclosure pertains to a torque converter having a variable pitch stator.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Even with a very high speed ratio selected, the gearbox input speed is zero when the vehicle is stationary. Since an internal combustion engine is incapable of generating torque at zero shaft speed, some type of launch device is typically employed between the engine and the gearbox input shaft. A common launch device for automatic transmissions is a fluid coupling. A fluid coupling is a hydrodynamic torque transfer device having an impeller and a turbine in a torus shape surrounding the transmission axis. When the impeller rotates faster than the turbine, the impeller causes fluid to rotate in the torus exerting torque on the turbine and a resistance torque on the impeller. A torque converter is a fluid coupling that also includes a stator that is held against rotation. The stator redirects the flow such that the torque applied to the turbine is greater than the resistance torque on the impeller. When the vehicle is stationary, the turbine is also stationary but the impeller may be coupled to the engine crankshaft. Due to the speed difference between impeller and turbine, the impeller resists rotation of the crankshaft. The resistance torque is small enough that it does not stall the engine. However, the engine must consume additional fuel, beyond that required for unloaded idle, in order to overcome the resistance torque. A multiple of the engine torque is transmitted to the gearbox input which is coupled to the turbine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
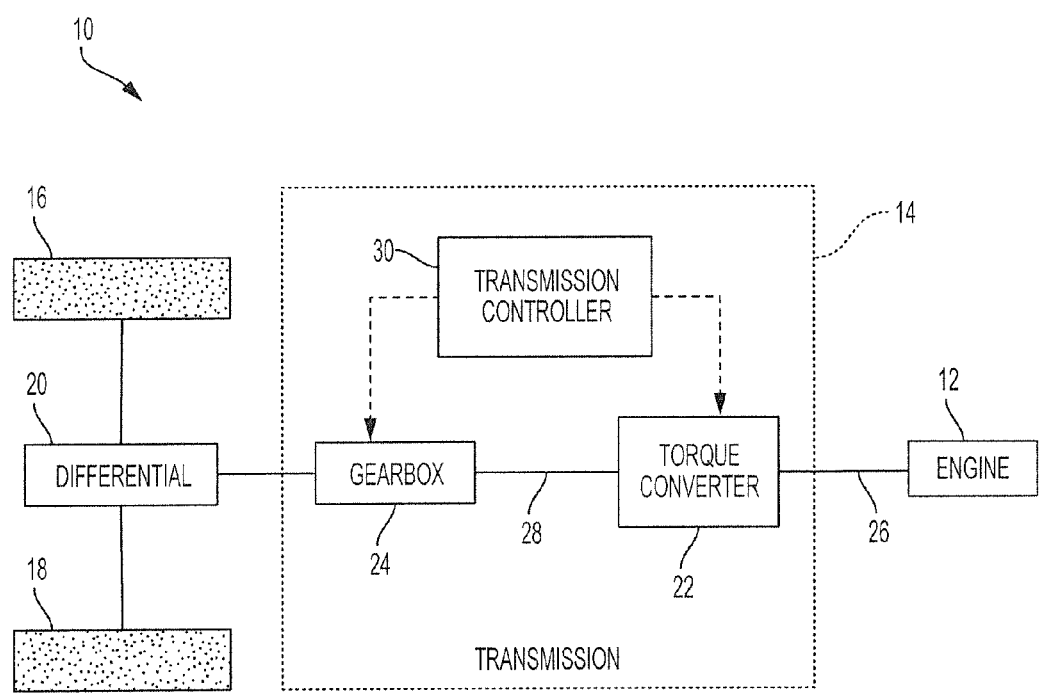
FIG. 1 is a schematic diagram of an exemplary vehicle powertrain.

FIG. 1 schematically illustrates a vehicle powertrain 10. The heavy lines indicate the flow of mechanical power, whereas the dashed lines indicate the flow of information. An internal combustion engine 12 generates mechanical power by converting stored chemical energy in a fuel source. Transmission 14 adapts the speed and torque of the mechanical power produced by the engine to suit the current needs of the vehicle. Mechanical power from transmission 14 is routed to left and right wheels 16 and 18 by differential 20. Differential 20 provides roughly equal torque to each wheel while accommodating slight differences in speed such as when the vehicle turns a corner. In a rear wheel drive vehicle layout, the differential also changes the axis of rotation by roughly 90 degrees and adjusts the speed and torque by a fixed final drive ratio. In a front wheel drive configuration, the differential may be integrated into the transmission, which may be called a transaxle.

The transmission 14 includes two power transfer stages, a torque converter 22 and a gearbox 24. The torque converter transmits power and torque from transmission input shaft 26 to turbine shaft 28. The gearbox 24 provides a number of speed ratios including multiple forward speed ratios and at least one reverse speed ratio. Gearbox 24 may include a number of controllable clutches that are engaged in various combinations to establish various fixed speed ratios. Alternatively or in combination, gearbox 24 may include a variator capable of establishing any speed ratio between fixed limits. The variator and clutches respond to commands from transmission controller 30. These commands may be conveyed, for example, by adjusting an electrical current which, in turn, adjust a pressure of a fluid in a piston apply chamber. Transmission controller 30 may be a dedicated controller or its functions may be integrated into another controller in the vehicle such as a powertrain controller.

Figure 2:
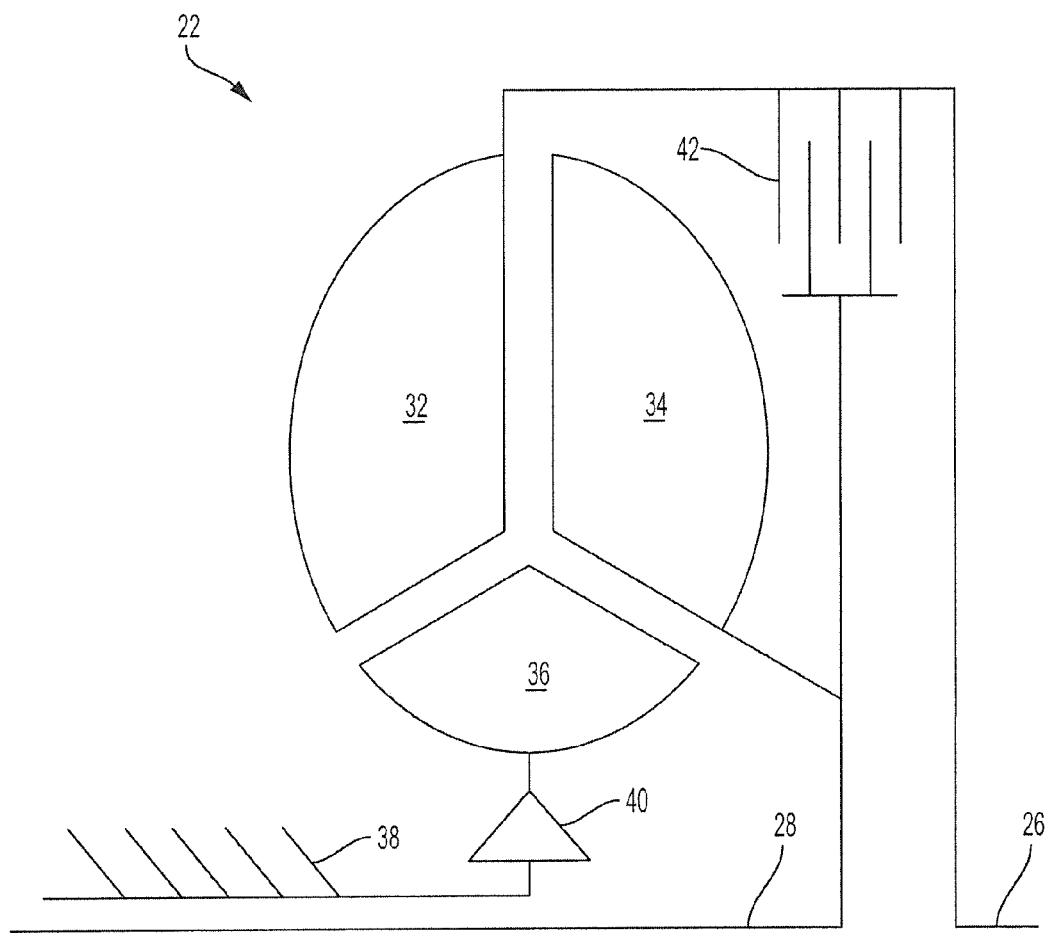
FIG. 2 is a schematic illustration of an exemplary torque converter.

FIG. 2 schematically illustrates torque converter 22. Torque converter 22 provides two parallel power flow paths from transmission input shaft 26 to turbine shaft 28. A hydrodynamic power flow path includes impeller 32 and turbine 34. Impeller 32 is fixedly coupled to transmission input shaft 26 which is adapted for fixation to an engine crankshaft. Turbine 34 is fixedly coupled to turbine shaft 28. Stator 36 is coupled to transmission housing 38 by passive one way clutch 40. At low turbine shaft speeds, impeller 32 causes fluid to flow around the torus from impeller 32 to turbine 34 to stator 36 and back to impeller 32. Stator 36 is held against rotation by one way clutch 40 such that it can redirect the flow and provide a reaction torque for torque multiplication. As the speed of turbine 34 approaches the speed of impeller 32, fluid in the torus flows circumferentially around the input shaft with the impeller and turbine. One way clutch 40 then overruns such that stator 36 can rotate rather than impeding this flow. Transmission input shaft 26 is selectively coupled to turbine shaft 28 by bypass clutch 42 providing a second power flow path.

Power flow through the hydrodynamic power flow path is governed by the speed of impeller 32 and the speed of turbine 34. The relationship between the speeds and the torques is a complex function of torus geometry and of the blade angles of the impeller, turbine, and stator. At a constant turbine speed, both impeller torque and turbine torque increase as impeller speed increases. A torque converter designed to exert a higher resistance torque on the impeller at a given impeller and turbine speed is called a stiffer converter, whereas a torque converter designed to exert a lower torque for the same impeller and turbine speed is called a looser converter. The ratio of turbine torque to impeller torque generally increases as the ratio of impeller speed to turbine speed increases. However, based on conservation of power, the torque ratio is never greater than the speed ratio. The product of the speed ratio and the torque ratio is the converter efficiency, which varies between zero and one as a function of impeller speed and turbine speed. The torque ratio when the turbine is stationary is called the stall torque ratio. Torque converter design often involves compromises between achieving the desired stiffness, maximizing efficiency, and maximizing torque ratio. The most advantageous combination of properties differs for different vehicle operating conditions.

When the vehicle is stationary and gearbox 24 is engaged, turbine 34 will also be stationary. The engine and impeller 32 rotates at the engine idle speed. The resistance torque exerted by the impeller on the engine requires the engine to consume more fuel to stay at idle speed than would be necessary if the engine was unloaded. To minimize the idle fuel flow rate, a looser converter is preferable in this operating condition.

When a driver want to accelerate as quickly as possible from a stationary condition, different torque converter properties may be important. The torque exerted on the turbine is equal to the product of the engine torque and the torque converter stall torque ratio. Consequently, a high stall torque ratio is important. A high stall torque ratio may permit a lower transmission gear ratio in first and reverse gears, a reduction in the number of distinct transmission ratios, reduced spacing between the ratios, a reduction in the final drive ratio, or some combination of the above. The torque that an internal combustion engine is capable of producing may be a function of the engine speed. For a turbocharged engine, the maximum torque may not be available until after the engine has operated at that speed for several seconds. A torque converter that is too stiff will not permit the engine speed to rise to the speed at which it generates its maximum torque. Once the vehicle starts to move, the turbine shaft speed increases. As the turbine shaft speed increases, the impeller speed tends to also increase and the torque ratio tends to drop. As the impeller speed increases, the engine speed will eventually exceed the maximum torque speed and continue increasing toward the engine redline speed. At that point, gearbox 24 must upshift to a lower speed ratio (higher numbered gear) which decreases transmission output torque. If the torque converter is too loose, the upshift point is reached too quickly. Therefore, the converter stiffness must be carefully tailored to the engine torque and speed characteristics over a range of converter speed ratios.

A torque converter with appropriate characteristics may reduce the likelihood that vehicle occupants will be annoyed when gearbox 24 shifts from one speed ratio to another. During an upshift from a high gearbox speed ratio to a lower gearbox speed ratio, the speed of turbine shaft 28 decreases. The speed of impeller 32 and the engine also decrease, but by proportionately less than the turbine shaft speed decreases. The rate at which the engine speed drops to the new value depends on the stiffness of the converter. Since the torque converter speed ratio increases, the torque converter torque ratio may also increase partially offsetting the decrease in gearbox torque ratio. Since the engine speed and transmission output torque change by less than they would with bypass clutch 42 engaged, the shift is less noticeable to vehicle occupants. Furthermore, shifting gearbox 24 may require the carefully coordinated engagement of one friction clutch and release of another friction clutch. Even when performed well, some torque fluctuations are unavoidable. The torque converter tends to absorb energy from these fluctuations and prevent vibration of powertrain components that may otherwise result.

When the vehicle is cruising at moderate speeds, the power required is generally low and fuel efficiency is important. Often, bypass clutch 42 may be engaged during cruise to transmit the engine torque to the turbine shaft with very high efficiency. However, in some conditions, especially at lower speeds with high gearbox speed ratios, bypass clutch 42 may be disengaged because the torsional vibration isolation provided by the hydrodynamic power flow path is needed. In these circumstances, torque converter efficiency is very important. An excessively loose converter will permit too much speed difference between the engine and the turbine shaft, lowering efficiency. Also, a larger speed difference between the engine and the turbine shaft makes the transition from the hydrodynamic power flow path to bypass clutch 42 more difficult to execute smoothly which increases the percentage of time that the bypass clutch 42 is disengaged.

As described above, the optimum torque converter characteristics differ among different operating conditions for a particular vehicle. Selection of a torque converter with fixed characteristics requires compromises among these operating conditions. A torque converter that has variable characteristics which can be actively controlled permits selection of characteristics that are more suitable for each operating condition. One way to vary the torque converter characteristics is to change the blade angle of the blades in the stator. However, in order to reduce the space required, a current trend in torque converter design is to make the stator very narrow. This trend reduces the axial length available to accommodate a mechanism for changing the stator blade angle. This packaging constraint is exacerbated by the need to package a one way clutch in the same area.

Figure 3:
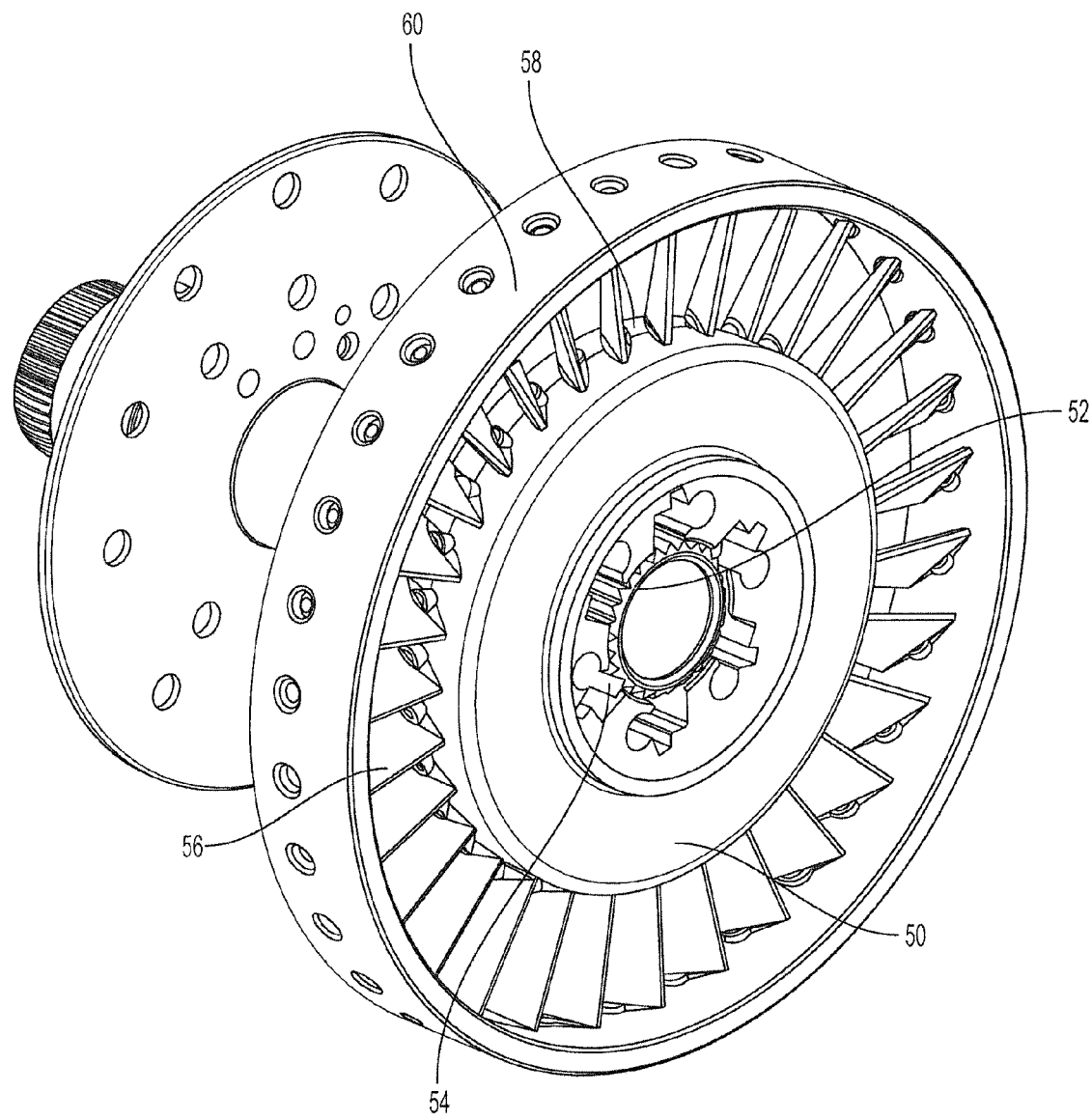
FIG. 3 is a pictorial view of a torque converter stator.

FIG. 3 shows a torque converter stator assembly with variable pitch blades integrated with a passive one way clutch. The assembly includes a stator hub 50 supported to rotate with respect to a stationary shaft 52. The stationary shaft 52 is adapted to be fixed to the front support of a transmission. A series of rockers 54 rotate with hub 50 and engage teeth on stationary shaft 52 to prevent rotation in one direction. A spring (not shown) forces the rocker into engagement with stationary shaft 52. The rockers are oriented such that they do not engage shaft 52 when hub 50 rotates in the opposite direction. Instead, teeth on the stationary shaft 52 force the rocker to briefly pivot and compress the spring. When the stator hub 50 rotates fast enough, centrifugal forces cause the rockers to pivot out of contact with the stationary shaft teeth, reducing parasitic drag torque. A number of radial blades 56 are pivotally supported by hub 50 in conjunction with inner locking ring 58 and outer ring 60. Other types of one way clutch designs are known. However, other type one way clutches tend to require more axial length. The reduced axial length of the rocker one way clutch makes space available for the mechanism that controls the angle of the blades 46.

Figure 4:
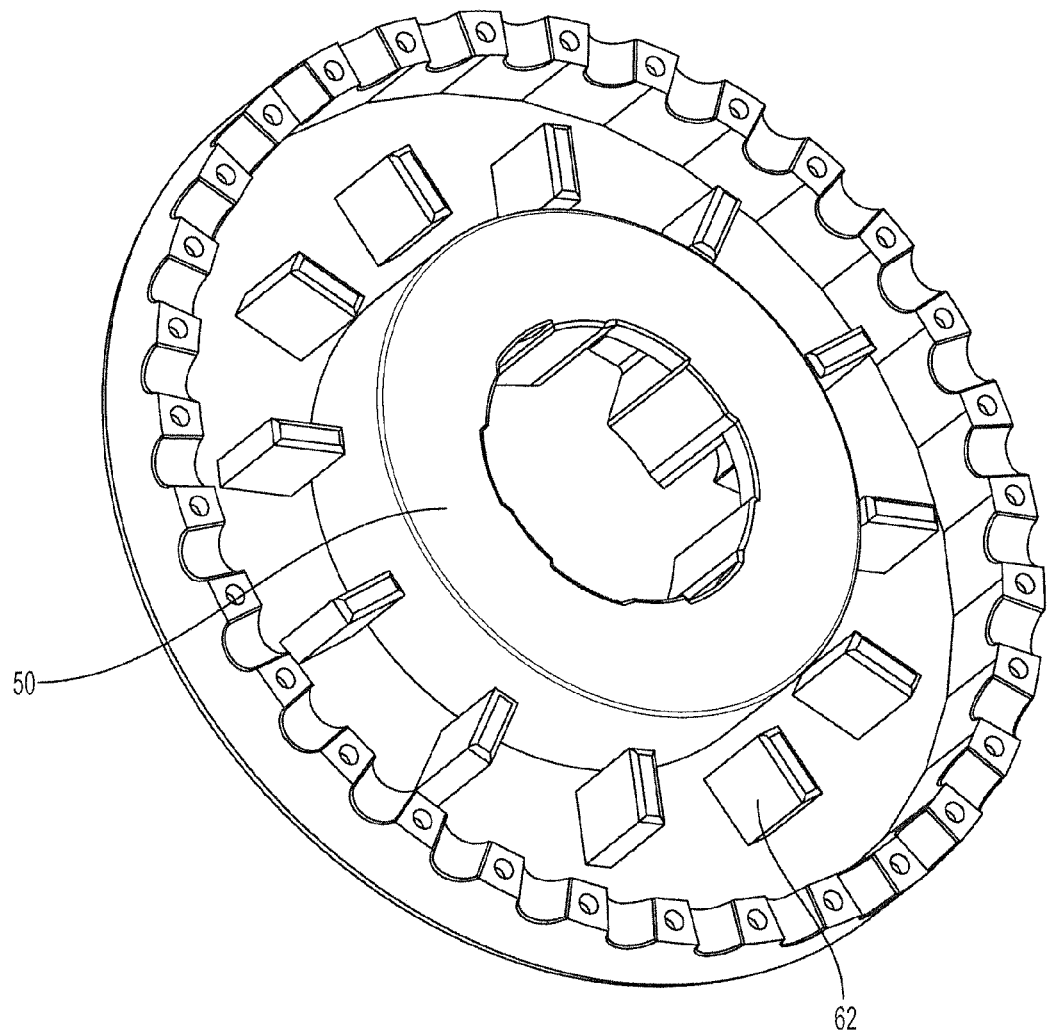
FIG. 4 is a pictorial view of a stator hub of the torque converter stator of FIG. 3.
Figure 5:
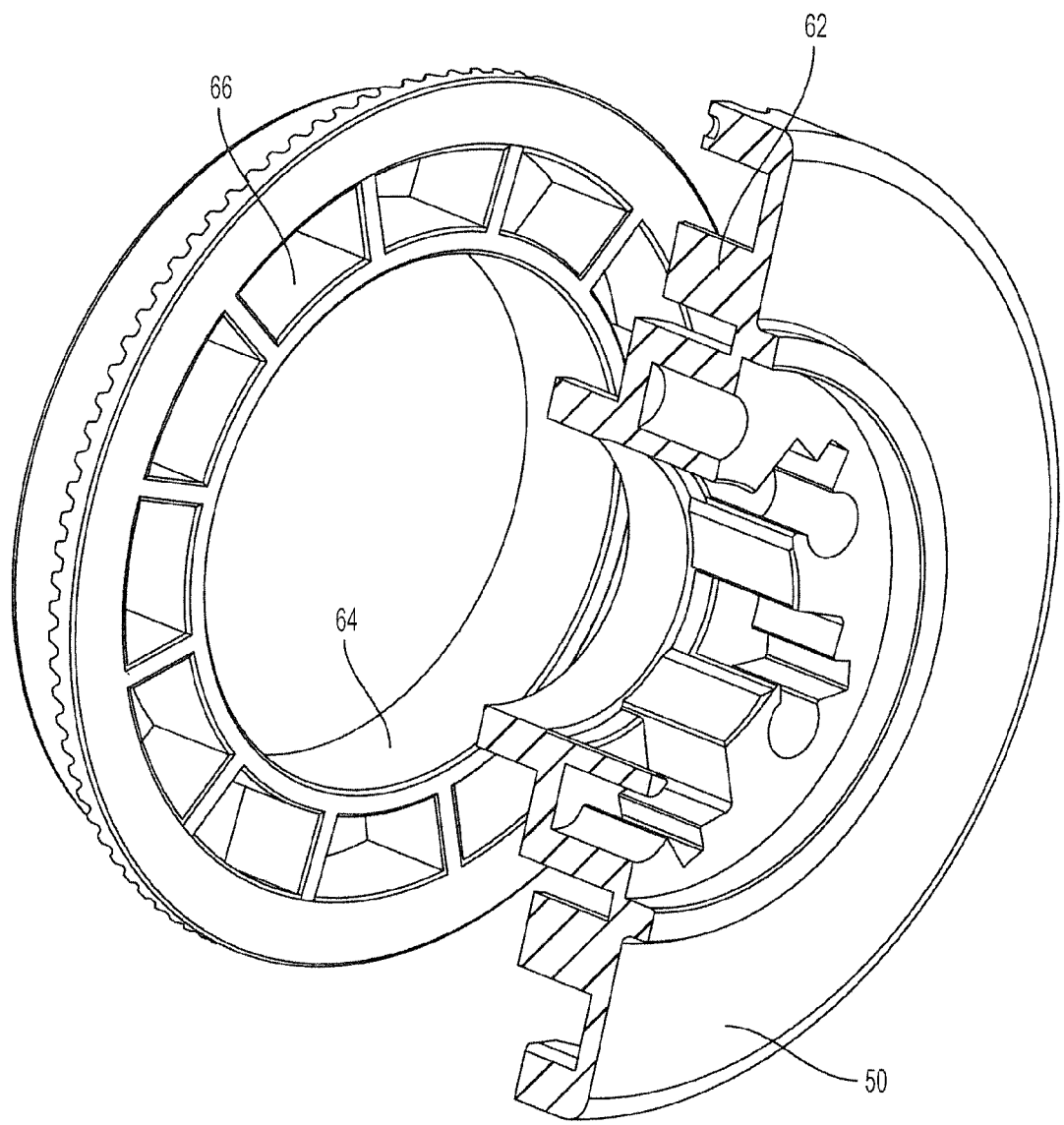
FIG. 5 is a partial cut-away exploded view of a stator hub and control ring of the torque converter stator of FIG. 3.

FIG. 4 shows the transmission side of the stator hub 50. A number of protrusions 62 are formed into stator hub 50. FIG. 5 shows an exploded view of a cut-away of stator hub 50 and control ring 64. A number of partial chambers 66 are formed into control ring 64. The control ring 64 is assembled to the stator hub 50 such that each protrusion 62 fits into a corresponding chamber 66. Elastomeric material may be installed at the interface between control ring 62 and hub 50 to effectively seal each chamber. Each protrusion 62 divides each chamber 66 into two chambers. Elastomeric material may be installed on the protrusion to effectively seal these chambers from one another. Control ring 62 is piloted on hub 50 such that it can rotate with respect to hub 50. As the control ring rotates with respect to the hub, the volume of one partial chamber increases and the volume of a corresponding chamber decreases.

Figure 6:
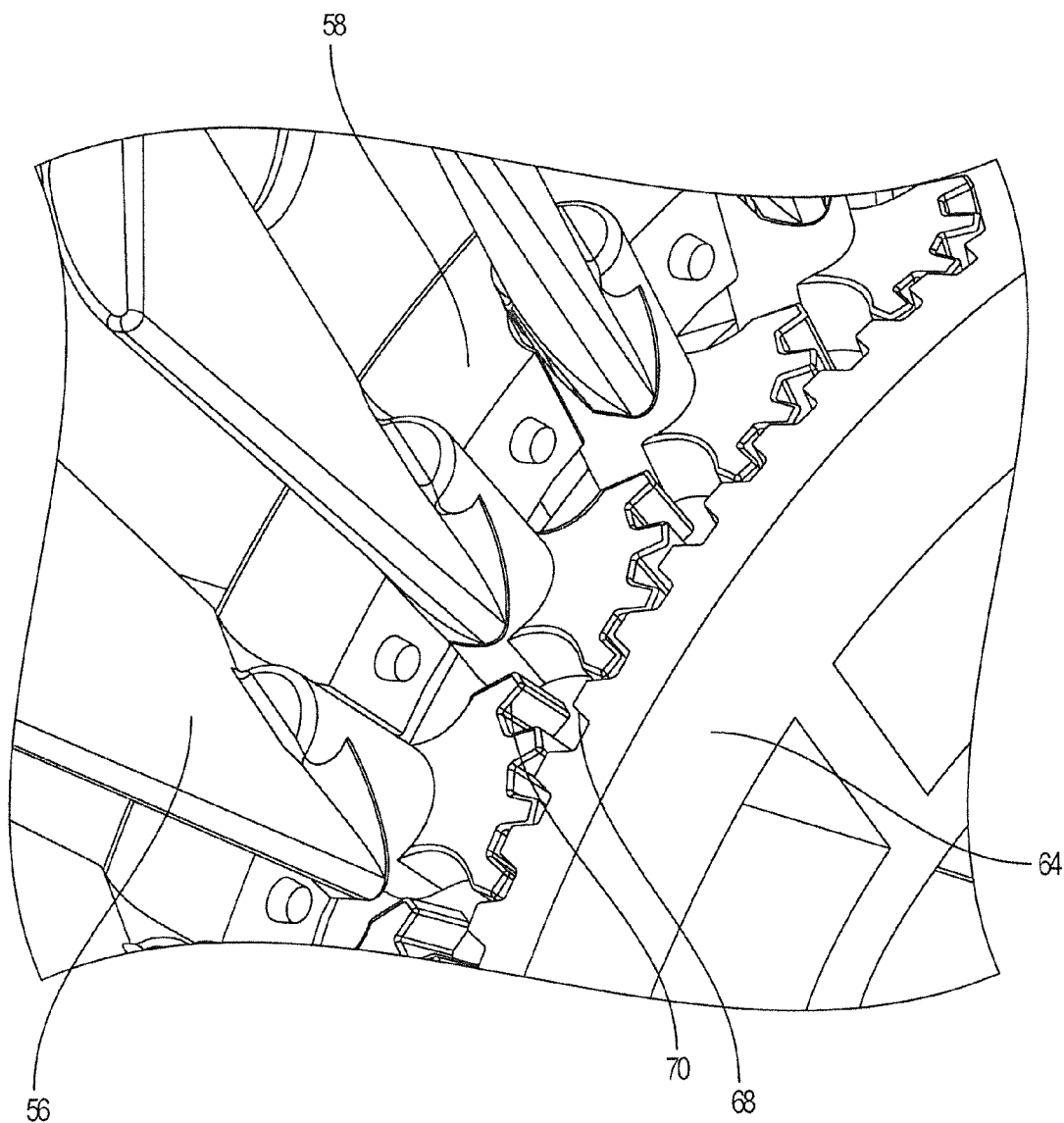
FIG. 6 is a close-up pictorial view of the control ring, locking ring, and stator blades of the torque converter stator of FIG. 3.

FIG. 6 shows a close-up view of the interface among control ring 64, locking ring 58, and the blades 56. Stator hub 50, which interfaces with locking ring 58 to support the blades 56, is not shown in this figure. Stator hub 50 and locking ring 58 are fixed to one another such that they rotate as a unit. A number of gear teeth 68 are formed into control ring 64. Gear teeth 68 mesh with gear teeth 70 on each blade 56. As the control ring 64 rotates with respect to the stator hub 50 and the locking ring 58, the meshing teeth force the blades 56 to rotate about their axes. This rotation of the stator blades changes the stiffness and torque multiplication characteristics of the torque converter.

The stator blade angle is controlled by varying the rotational position of control ring 64 with respect to stator hub 50. One or more springs may be installed between stator hub 50 and control ring 64 to bias the relative position toward a default relative position. For example, springs could be placed within one or more chambers tending to expand those chambers. Alternatively, a spring may be external to any chamber. Hydraulic fluid at a controlled pressure is then routed through the stationary shaft 52 to one set of chambers. When the pressure of the fluid is increased, the volume of those chambers increases varying the rotational position of the control ring 64 with respect to the stator hub 50. In some embodiments, a second passage may route hydraulic fluid at a different controlled pressure to the opposite set of chambers. In these embodiments, the blade angle may be varied by controlling the relative volumes of the two chambers. When separate fluid passages are provided to both sets of chambers, springs biasing the control ring 64 toward a default position relative to the stator hub 50 are not mandatory. Methods of routing fluid from a stationary shaft to a rotating component are well known. However, these methods require that the interface between the parts have an adequate axial length. Packaging requirements of the vehicle limit the axial space available for the stator assembly. The short axial length requirement of the rocker type one way clutch permits this hydraulic interface without exceeding the overall axial length available.

The blade angle may be controlled in closed loop fashion by controller 30. For example, controller 30 may vary an electrical current to a solenoid that, in turn, varies the hydraulic pressure in circuits routed to the chambers. Closed loop control requires some feedback signal indicating the present position. The feedback signal could come from a position sensor or could come from some sensor that detects a quantity related to blade angle. For example, by measuring engine speed, turbine speed, and either impeller torque or turbine torque, the torque converter stiffness can be calculated and used as a feedback signal.

The controller may consider many factors to determine the desired blade angle for various operating conditions. For example, a combination of low vehicle speed and high power demand, as indicated by accelerator pedal position, may call for a blade angle that produces maximum torque multiplication and a loose characteristic. Internal combustion engines may be capable of generating more torque at higher engine speed and a looser characteristic results in higher engine speeds than a tight characteristic. As the vehicle accelerates, the controller may gradually change the blade angle to tighten the characteristic, preventing the engine from continuing to accelerate past its maximum torque speed. On the other hand, at lower torque demand, a tighter characteristic may result in a lower engine speed at which the engine and torque converter are both more efficient reducing fuel consumption.

The maximum torque capability of a normally aspirated engine drops as the atmospheric pressure drops at higher altitude. The controller may compensate for this effect by changing the blade angle to a looser characteristic as a function of ambient pressure as measured by a pressure sensor or as a function of altitude as determined by a navigation system. The looser characteristic results in higher average engine speed which increases torque availability. Turbo-charged engines include a compressor that increases the pressure of the intake air above ambient pressure. Although a turbo-charged engine may be less sensitive to ambient pressure once the turbo-charger is effective, there is a delay while the turbo-charger itself comes up to its operating speed in response to exhaust gases. The delay may increase if the engine produces less power because that is associated with less engine exhaust. Degraded performance at altitude may be more problematic with turbo-charged engines because a smaller engine displacement may be selected for a particular vehicle size. The controller may reduce the delay by changing the blade angle in response to turbo-charger speed. When the turbo-charger is slow, a looser characteristic is selected increasing torque delivery by increasing engine speed and also increasing the acceleration of the turbo-charger by increasing the exhaust. As the turbo-charger comes up to its operating speed, the characteristic is gradually tightened.

During cruise, the torque converter bypass clutch is typically engaged to avoid the parasitic losses associated with an open converter. However, various events, such as certain shifts, may require disengagement. With a torque converter characteristic optimized for launch, or even as a compromise of other operating conditions, the slip across an open converter in cruise conditions can be considerable. Excessive slip is disadvantageous for two reasons. First, more slip increases the parasitic losses of the converter increasing fuel consumption. Second, it is more difficult to re-lock the converter, so the controller may operate the converter in the open mode longer while waiting for an opportunity to lock it back up again. With a variable pitch stator, the controller can command a tight characteristic for these temporary unlock events. If the nature of the event for which the unlock is commanded requires a looser characteristic, the controller can command the looser characteristic during the event and then command a tighter characteristic to facilitate re-locking.

Some circumstances during vehicle operation call for short duration reductions in torque. For example, when a vehicle equipped with traction control senses wheel slip, the controller calls for a reduction in transmission output torque which may be accomplished by reducing engine torque. Since the torque change must be accomplished rapidly, the engine may respond by retarding spark timing rather than by changing the throttle position of fuel flow rate. When the spark timing is reduces, engine efficiency is very low. A controllable pitch stator would provide a fast enough actuator to provide an alternative to retarding spark timing. By rapidly transitioning to a looser characteristic, turbine torque would drop quickly. The engine speed would then begin to rise, so engine control would be needed to reduce engine torque to prevent the engine speed from increasing excessively. However, a slower acting engine control could be selected. Another disadvantage of spark timing as a torque control mechanism is that, in most conditions, it cannot be used to increase torque. Some circumstances call for a short term increase in turbine torque rather than a decrease. For example, there may be a "torque hole" during a shift during which the transmissions torque multiplication drops below the torque multiplication associated with either the starting gear ratio or the ending gear ratio. Filling this torque hole requires a momentary increase in turbine torque. The controller could accomplish this by rapidly transitioning to a tighter characteristic. Engine speed will begin to decrease following the transition. For an upshift, decreasing engine speed is a desirable side effect.

Stator blades are hydrofoils. Like other hydrofoils, they are designed to operate over a range of angles of attack which is defined as the difference in the angle of fluid approaching the blade and the angle of the blade. The angle of flow of fluid approaching the blade is determined, among other things, by the speed of the turbine. Like other hydrofoils, the degree to which the stator changes the angle of the flow increases as the angle of attack increases up to a point called the stall angle. As the angle of attack increases above the stall angle, the ability of the blade to change the direction of the flow rapidly decreases. When this happens, the torque converter becomes ineffective as a torque transfer device. In other words, the torque converter becomes very loose and the torque ratio becomes very low. The circumstance in which stator stall is generally encountered in a vehicle is if the transmission is shifted into 1st gear while rolling backwards or is shifted into reverse while rolling forward. These situation result in the turbine rotating backwards. When stator stall occurs, the transmission reacts as if it is not in gear. With a controllable stator, the controller can avoid this situation by changing the blade angle to avoid the stall condition.

Although a stator stall is undesirable in the circumstance described above, it may be desirable in other circumstances. In such circumstances, the controller can induce a stator stall by changing the blade angle. For example, when a vehicle is idling in drive, as it would be while waiting at a stop light, the torque converter resist engine rotation increasing the fuel flow required to maintain idle speed. The fuel flow rate can be decreased by reducing the engine load by changing the blade angle to induce a stator stall. Once the driver indicates an intent to accelerate by releasing the brake pedal, the stator blades can be rapidly returned to their normal launch position. Some vehicle are designed to reduce idle fuel usage by stopping the engine when the vehicle is stationary and restarting the engine when the driver releases the brake pedal. For such vehicles, rapid engine starting is crucial to avoid driver dis-satisfaction from launch delay. Unloading the engine by stalling the stator during an engine start reduces the engine start time. Another issue faced by such vehicles is caused by engine torque fluctuations during engine stopping. When the transmission is in gear, these torque fluctuations are transmitted to the driveline and can often be perceived by vehicle occupants. By stalling the stator during engine stopping, these torque fluctuations would not be transmitted to the driveline.

A torque converter operates in two different modes. When the turbine speed is low relative to the impeller, the stator is stationary and the torque converter operates in a torque multiplication mode. When the ratio of turbine speed to impeller speed exceeds a coupling point, the one way clutch overrun and the torque converter operates in a fluid coupling mode. Of the scenarios listed above, some are applicable to the torque multiplication mode and others are applicable to the fluid coupling mode. Much of the challenge of controlling the stator blade angle is associated with the fact that the stator rotates. A mechanism that allowed control of the stator blade angle while the stator is stationary and a fixed stator blade angle in fluid coupling mode would provide all of the advantages associated with the torque multiplication mode. Controlling the stator blade angle while the stator is stationary would not require routing fluid between components. One property of a rocker one way clutch is that it stops the rotating component in one of a fixed number of rotational positions. A second rocker one way clutch could be provided between the control ring and a hollow control shaft concentric with the stationary shaft. These rocker one way clutches would ensure that, in the torque multiplication mode, the relative rotational position of the control ring and the stator hub is determined by the rotational position of the hollow control shaft. Since the hollow control shaft rotates only through a very narrow range of angles, controlling its rotational position is relatively simple.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A torque converter stator comprising:
   a hub;
   a ring supported to rotate relative to the hub about a rotational axis wherein the ring and the hub define a first chamber having a first volume that is a function of a rotational position of the ring relative to the hub; and
   a plurality of blades supported by the hub, each blade configured to pivot relative to the hub about a radial axis perpendicular to the rotation axis to vary a blade angle, wherein the blade angle is a function of the rotational position of the ring relative to the hub.

2. The torque converter stator of claim 1 wherein the ring and the hub define a second chamber having a second volume and wherein a sum of the first volume and the second volume is constant as the rotational position of the ring relative to the hub varies.

3. The torque converter stator of claim 1 further comprising a one way clutch configured to constrain rotation of the hub relative to a race about the rotational axis in a reverse direction while permitting rotation in a forward direction.

4. The torque converter stator of claim 3 wherein the one way clutch comprises a plurality of rockers supported to pivot relative to the hub about axes parallel to the rotational axis and configured to engage the race to prevent reverse rotation of the hub in a first position and to not engage the race in a second position.

5. The torque converter stator of claim 1 wherein gear teeth on a face of the ring mesh with gear teeth fixed to the blades.

6. A transmission comprising:
a stator hub supported for rotation about a fixed stator shaft;
a plurality of blades pivotally supported by the hub throughout a range of blade angles; and
a ring supported for rotation about the stator shaft, wherein gear teeth on a face of the ring mesh with gear teeth fixed to the blades.

7. The transmission of claim 6 wherein the ring and the hub define a first chamber having a first volume that is a function of a rotational position of the ring relative to the hub.

8. The transmission of claim 7 wherein the ring and the hub define a second chamber having a second volume and wherein a sum of the first volume and the second volume is constant as the rotational position of the ring relative to the hub varies.

9. The transmission of claim 6 further comprising a one way clutch configured to constrain rotation of the hub relative to the fixed stator shaft in a reverse direction while permitting rotation in a forward direction.

10. The transmission of claim 9 wherein the one way clutch comprises a plurality of rockers supported to pivot relative to the hub about axes parallel to the stator shaft and configured to engage the stator shaft to prevent reverse rotation of the hub in a first position and to not engage the stator shaft in a second position.

11. A transmission comprising:
a stator hub supported for rotation about a fixed stator shaft in a positive direction;
a plurality of blades pivotally supported by the hub throughout a range of blade angles;
a plurality of rockers supported to pivot relative to the hub and configured to engage the stator to prevent rotation of the hub in a reverse direction; and
a ring supported for rotation relative to the hub wherein the ring and the hub define a first chamber having a first volume that is a function of the rotational position of the ring relative to the hub.

12. The transmission of claim 11 wherein the ring and the hub define a second chamber having a second volume and wherein a sum of the first volume and the second volume is constant as the rotational position of the ring relative to the hub varies.

\* \* \* \* \*